United States Patent [19]
Leach

[11] 3,809,254
[45] May 7, 1974

[54] CASE PALLETIZER
[76] Inventor: John M. Leach, P.O. Box 341, Port Jefferson, N.Y. 11777
[22] Filed: Sept. 9, 1971
[21] Appl. No.: 179,091

Related U.S. Application Data
[62] Division of Ser. No. 34,201, May 4, 1970, Pat. No. 3,627,103.

[52] U.S. Cl. .............................. 214/6 P, 214/6 DK
[51] Int. Cl. ............................................. B65g 57/22
[58] Field of Search ......... 214/6 DK, 6 H, 6 P, 6 M, 214/6 N, 6 A, 6 FS, 6 G; 271/84, 68, 69

[56] References Cited
UNITED STATES PATENTS

| | | | |
|---|---|---|---|
| 3,608,746 | 9/1971 | Meyer | 214/6 H |
| 3,567,046 | 3/1971 | Reist | 214/6 DK |
| 3,583,472 | 6/1971 | Yamamoto | 214/6 DK |
| 3,517,831 | 6/1970 | Hahn | 214/6 H |
| 3,616,948 | 11/1971 | Imhof et al. | 214/6 DK |

FOREIGN PATENTS OR APPLICATIONS

| | | | |
|---|---|---|---|
| 1,016,134 | 1/1966 | Great Britain | 214/6 FS |
| 1,004,951 | 9/1965 | Great Britain | 214/6 H |
| 1,178,961 | 1/1970 | Great Britain | 214/6 H |

*Primary Examiner*—Robert J. Spar

[57] ABSTRACT

A palletizing machine which is particularly applicable to high speed loading of cases in tiers on pallets or other type of support in that every case received at th tiering operation and which requires repositioning is contacted by a case orienter and conducted to a scheduled relative position to ultimately form the desired tier or layer pattern without stopping forward motion of any case at any time. In addition the tiers so formed are alternately stacked onto two pallets or other supports without any lost time motions or movements.

1 Claim, 24 Drawing Figures

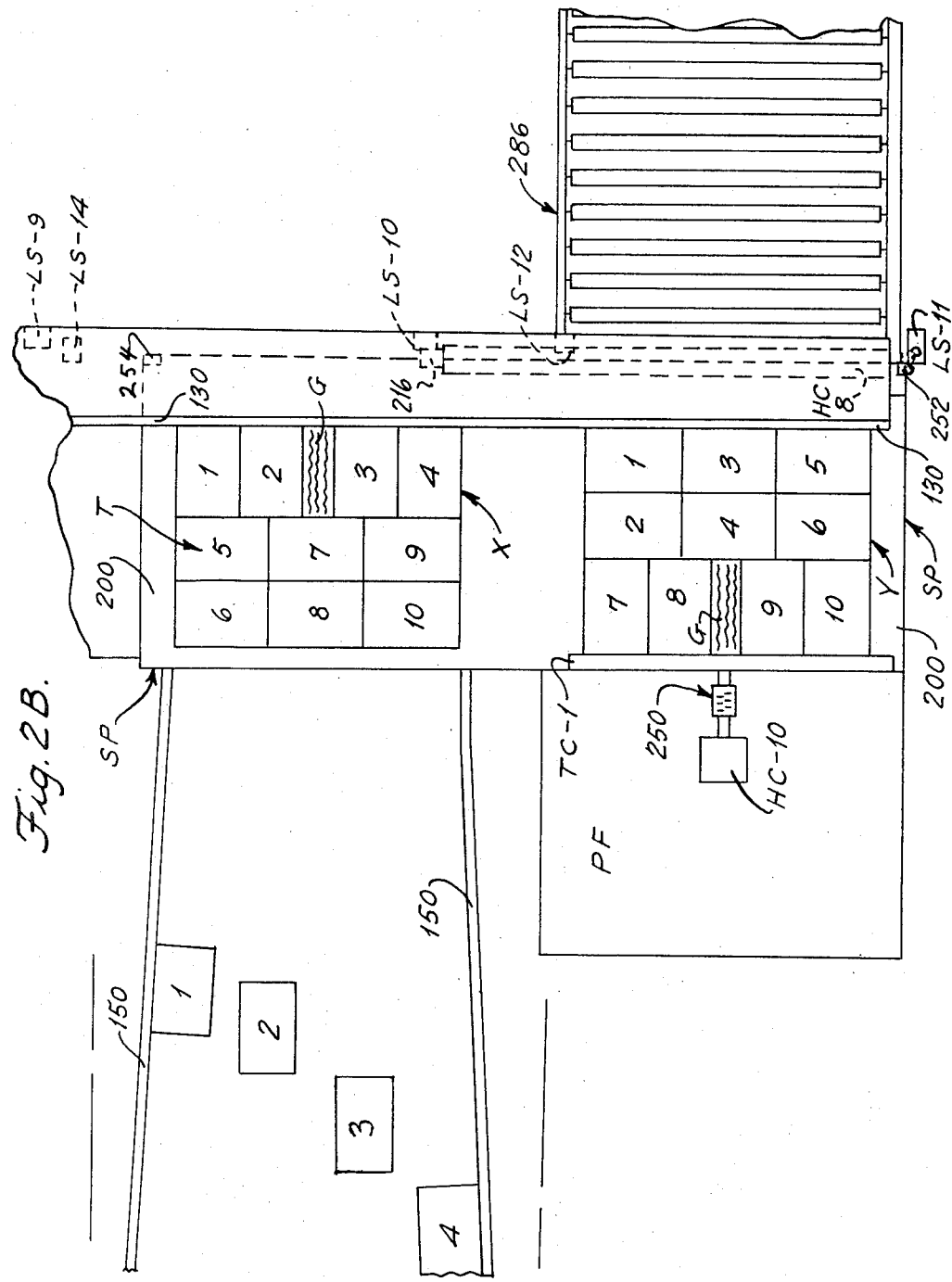

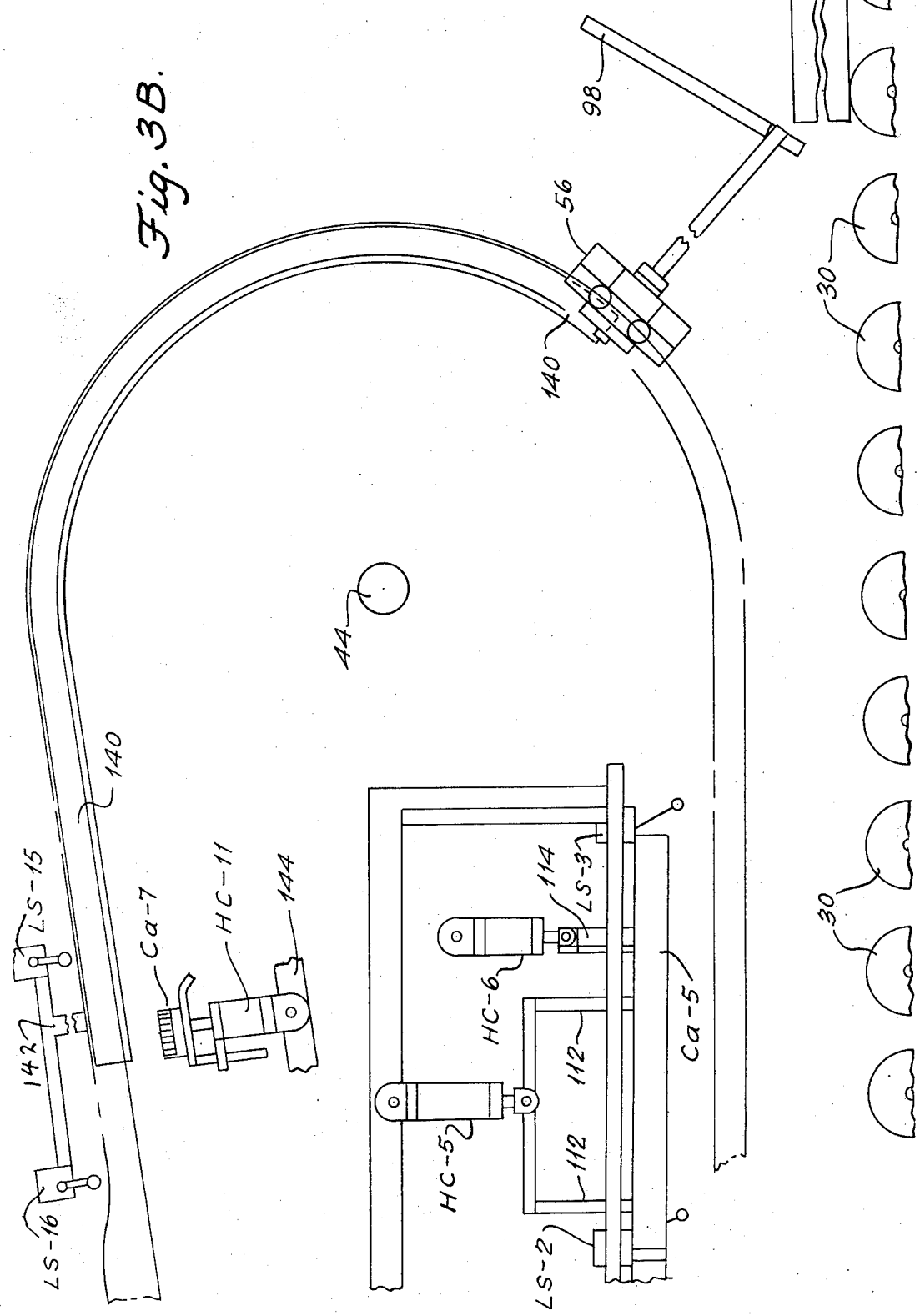

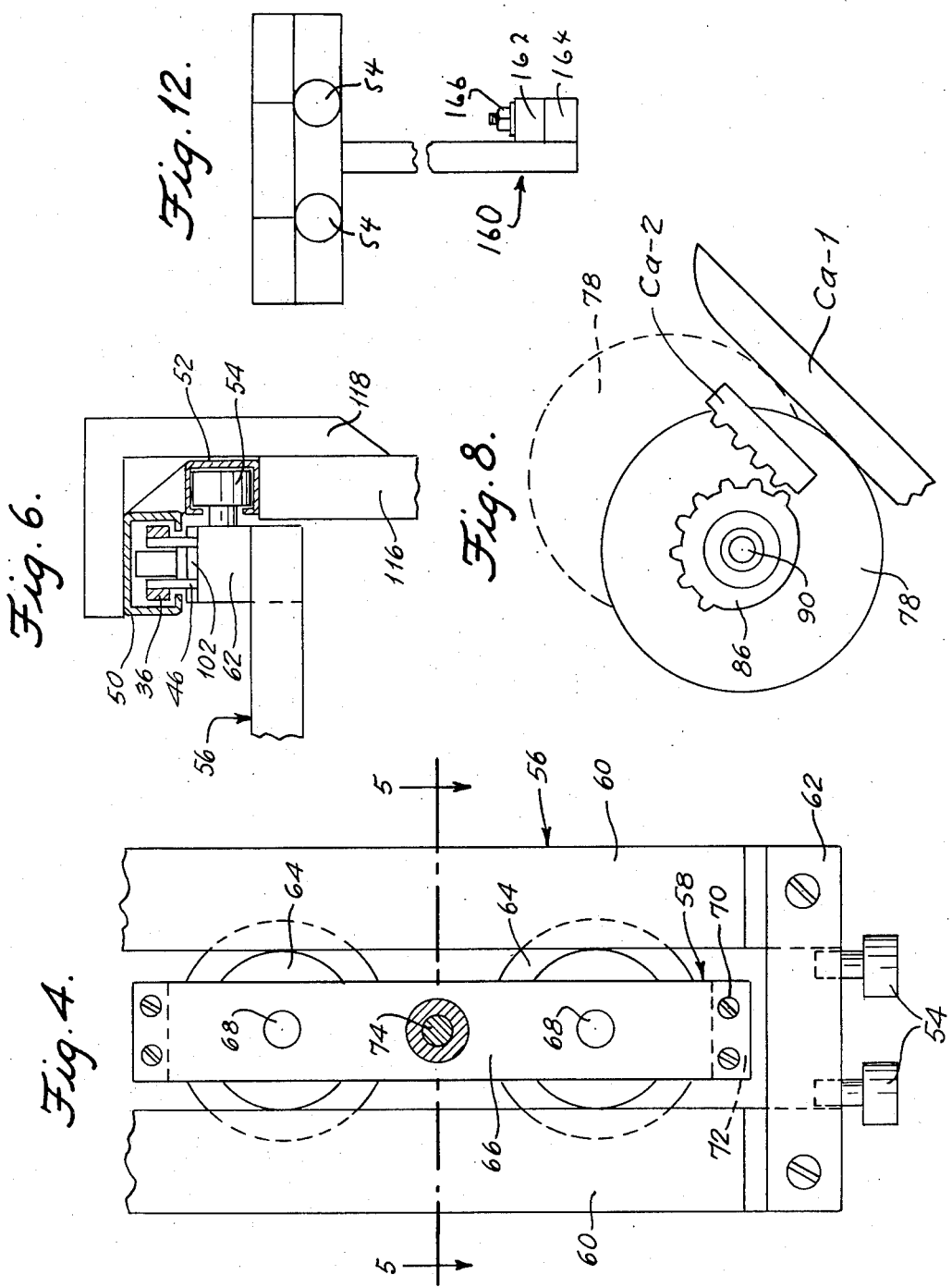

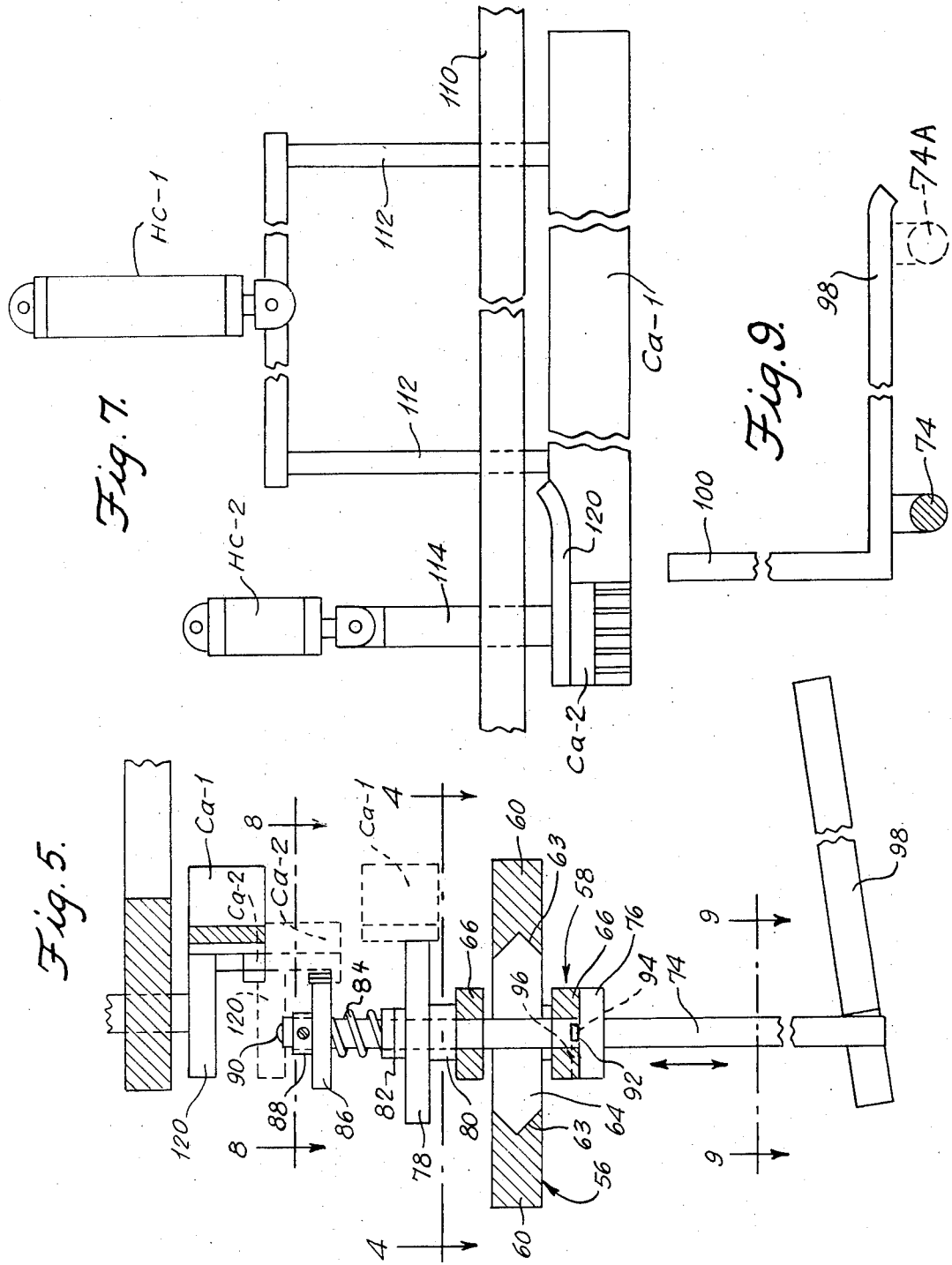

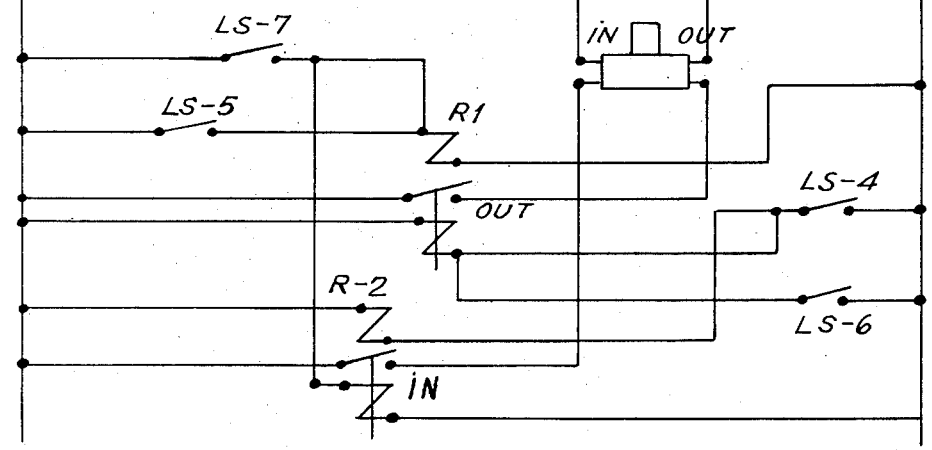
Fig. 14. TIER TRANSFER
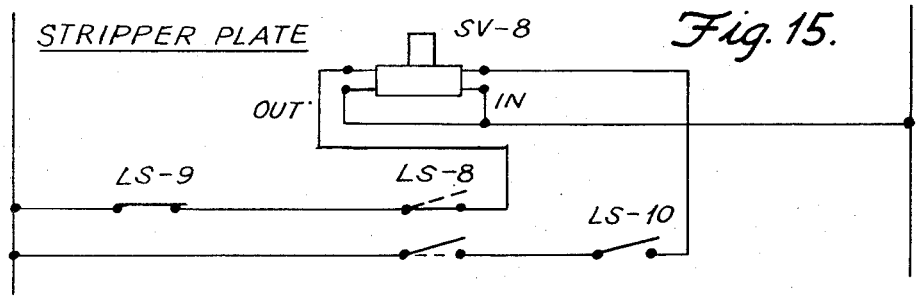
Fig. 15. STRIPPER PLATE
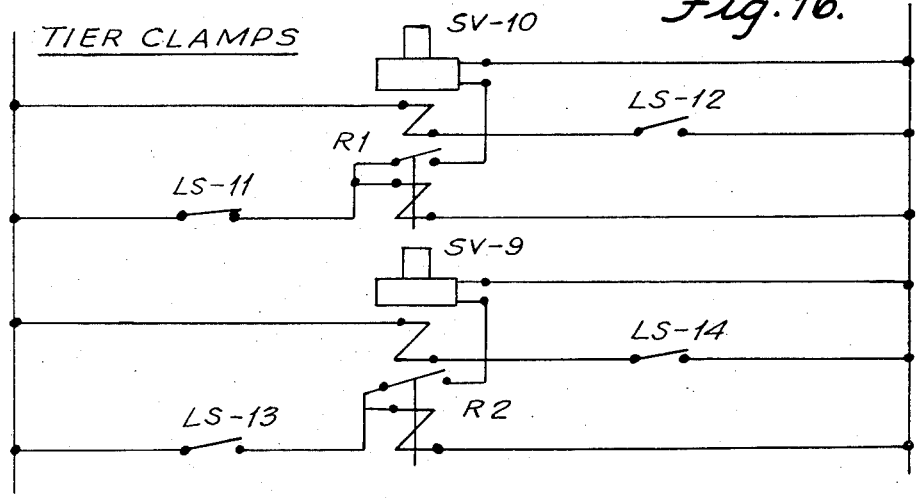
Fig. 16. TIER CLAMPS 3,809,254

CASE PALLETIZER

This application is a division of application Ser. No. 034,201, filed May 4, 1970 now U.S. Pat. No. 3,627,103.

BACKGROUND OF THE INVENTION

This invention relates generally to the field of stackers. More particularly, it relates to the positioning of cases of substantially any type in tiers or rows on pallets or sheets or, in the case of so called "palletless stacking," on any surface from which the stacked tiers can be conveniently removed by a fork truck or the like. The term "case" is being used herein to mean any object which can be run on the equipment disclosed. The palletizers heretofore available have involved the formation of cases in desired patterns by turning some of the cases at 90° as by using a turntable, a corner trip pin or by passing the case around a sharp ninety degree turn; have formed rows by stopping and then side indexing the cases and by similar procedures, all of which have involved stopping each case completely as much as two to four times before establishing its final position. This frequent stopping of the cases has been wasteful of time, has been damaging to the cases and their contents and has seriously restricted the number of cases which can be stacked a minute because cases moving at a high speed just cannot be stopped suddenly without demolishing them or their contents.

SUMMARY OF THE INVENTION

It is an object of the present invention to overcome the problems inherent in the palletizers of the prior art as described above by omitting the stoppages of the cases during the formation of the tier patterns. This has been accomplished by devising a case orienter which intercepts an incoming case which requires repositioning and, while maintaining the forward movement of the case, moving it laterally to one side to any extent required and also turning the case 90° when required and then releasing it while it is still moving in a substantially straight line and then gradually reducing its speed which causes it to overtake and overlap the case ahead of but to one side of it or if the case is directly in front of it the two will touch in line, still moving forward.

When all of the cases forming one tier have been properly oriented a condensing blade will be moved up behind the rearmost case of a given tier moving at a greater speed than the rearmost case so that all of the cases will be sequentially moved ahead gradually to a stopping point and the cases will simultaneously be directed together sideways from both sides so that the tier will come gently to a stop with all cases moved together into the final tier.

The tier so formed is then moved ahead onto a stripper plate which deposits it to one side or the other upon a pallet or other surface.

By this method no time is wasted by stoppages and likewise no cases or contents are damaged by sudden stops.

BRIEF DESCRIPTION OF THE DRAWINGS

The now preferred embodiment of the present invention is disclosed in the accompanying drawings, in which:

FIG. 2A and FIG. 2B and FIG. 2C all together constitute a plan view of the palletizer of the present invention, again with all parts not necessary to an understanding of the components intended to be covered by these Figures omitted;

FIG. 3A and FIG. 3B together constitute a side elevation of the case orienter of the present invention;

FIG. 4 is a fragmentary sectional view of a movable orienter cross bar taken substantially on the plane indicated by line 4 — 4 of FIG. 5 and looking in the direction of the arrows;

FIG. 5 is a cross sectional view of the case forward mover, side mover and turner carried by a cross bar of the orienter taken substantially on the plane indicated by line 5 — 5 of FIG. 4 and looking in the direction of the arrows;

FIG. 6 is a fragmentary sectional view of the chain drive and guide track for the movable cross bars of the orienter taken substantially on the line 6 — 6 of FIG. 1A and looking in the direction of the arrows;

FIG. 7 is a fragmentary side elevational view of two of the pattern forming control cams of the orienter and their control hydraulic cylinders on an enlarged scale to better show the detail;

FIG. 8 is a sectional view of two of the pattern forming control cams of the orienter taken substantially on the plane indicated by line 8 — 8 of FIG. 5 and looking in the direction of the arrows;

FIG. 9 is a sectional view of the case engaging arms of the case forward mover, said mover and turner taken substantially on the plane indicated by the line 9 — 9 of FIG. 5 and looking in the direction of the arrows;

FIG. 12 is an end view of a case condenser blade;

FIG. 14 is a circuit diagram of the tier transfer;

FIG. 15 is a circuit diagram of the stripper plate operating cylinder;

FIG. 16 is a circuit diagram of the tier clamps operating cylinders;

DESCRIPTION OF THE PREFERRED EMBODIMENTS

Throughout this description all parts which are not essential to an understanding of the invention such as drives, frames, supports, guards, bearings, etc. have been omitted in order to provide more space for a clear showing of the essential elements of the invention.

Figure 1A:
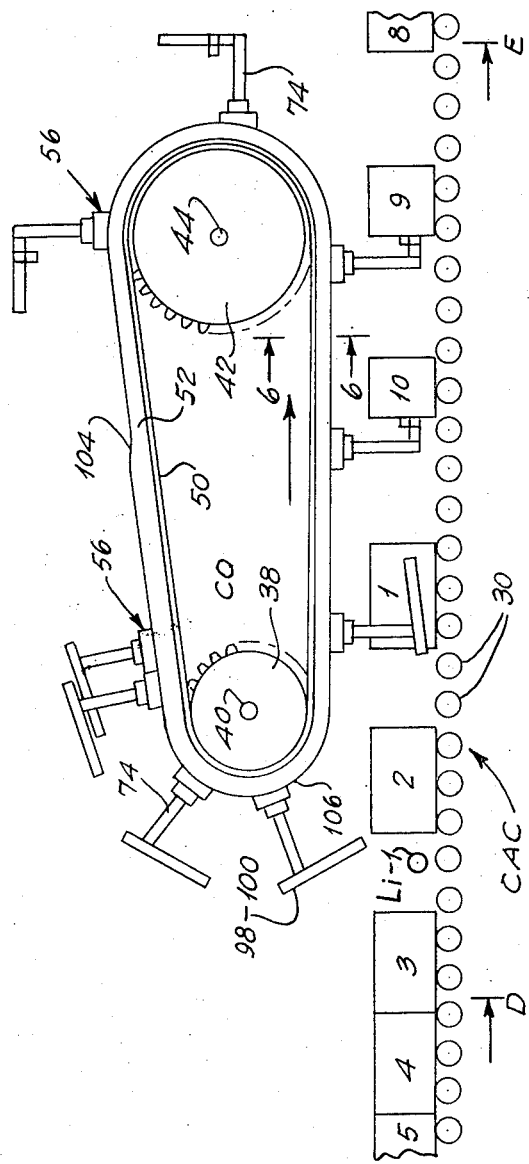
FIG. 1A and FIG. 1B together constitute a side elevational view of a palletizer of the present invention with all frame and other parts omitted which are not necessary to an understanding of the components covered by these Figures.
Figure 1B:
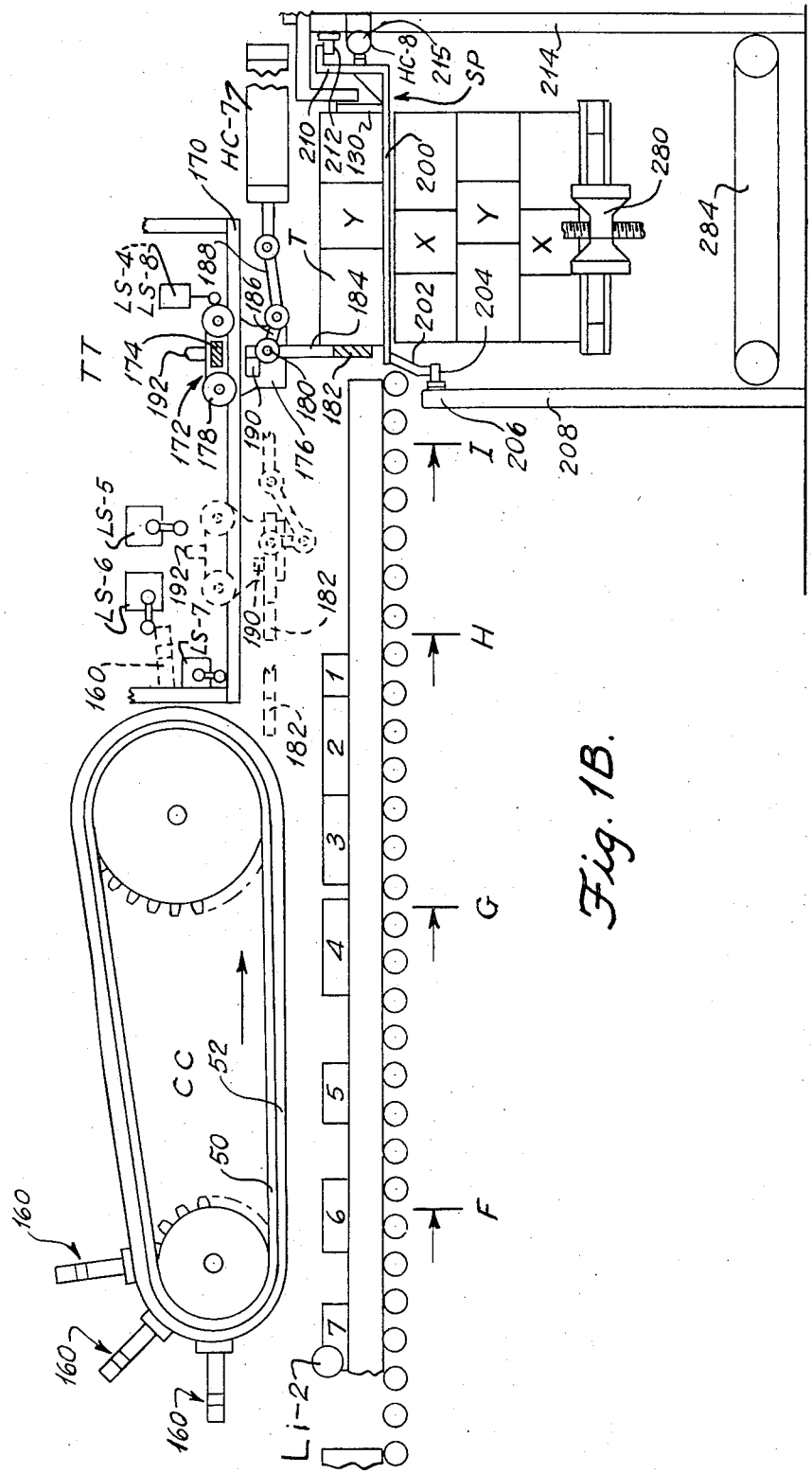

The preferred form of the palletizer invention as now disclosed includes a case advancing conveyor CAC, a case orienter CO, a case condenser CC, a tier transfer TT and a stripper plate SP as shown in FIGS. 1A and 1B.

Figure 11:
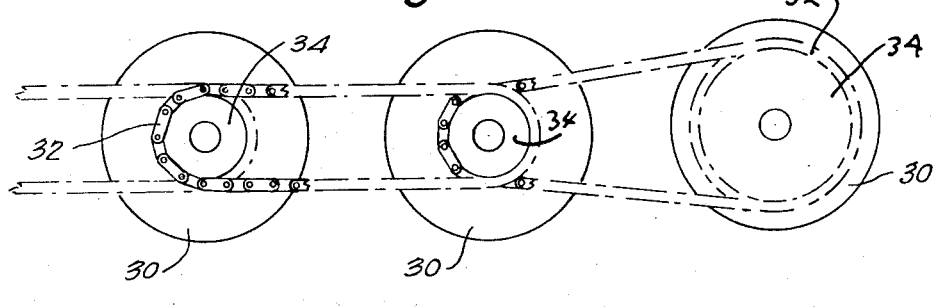
FIG. 11 is an enlarged scale detail view showing the drive inter-connection between the carrying rollers.

The conveyor CAC, orienter CO and the condenser CC are each independently driven by conventional drives not shown. The transfer TT and the stripper plate SP are operated by hydraulic cylinders HC-7 and HC-8 respectively. The case advancing conveyor CAC is preferably a liver roller conveyor with the rollers driven from one to another by chains 32 and sprockets 34 as shown in FIG. 11 in known manner with the roller at one end of the train being driven by a conventional drive.

Figure 2A:
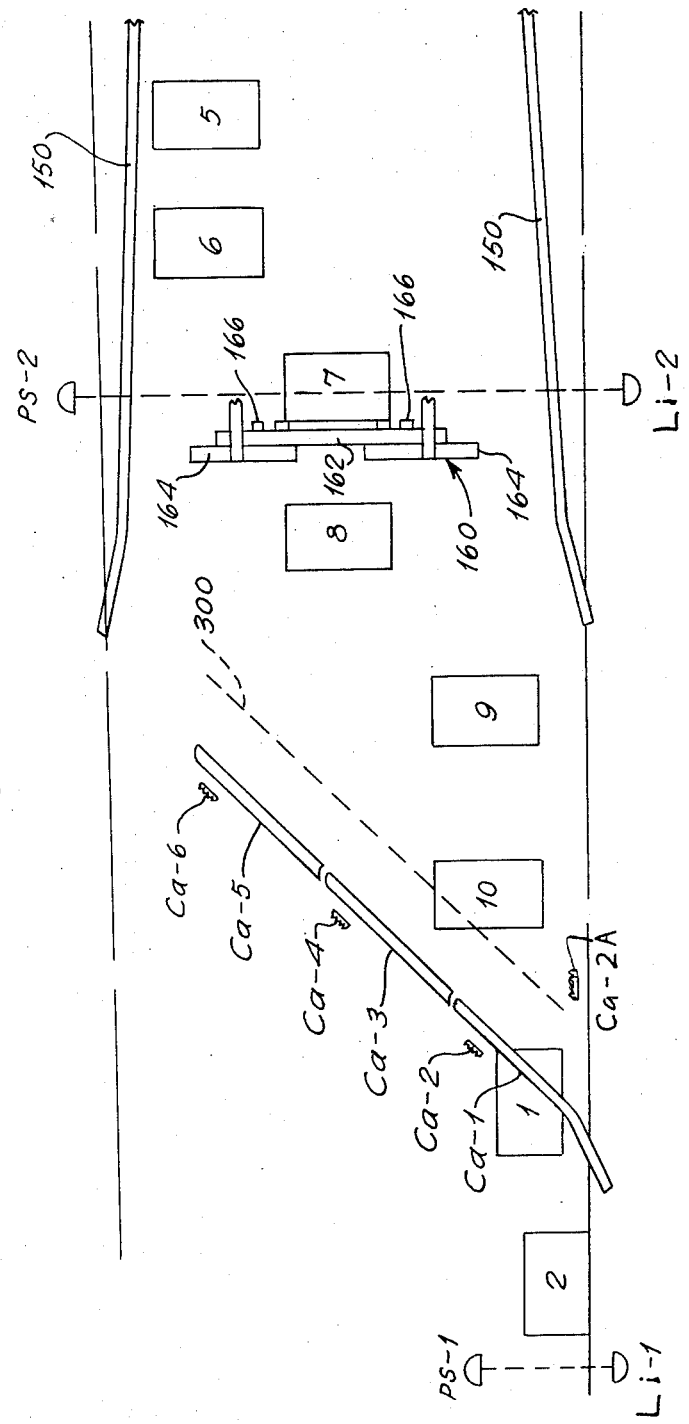

The cases being advanced by the rollers enter on the left as viewed in FIG. 1A and during the course of the travel along the length of the conveyor CAC are arranged into and emerge therefrom as a tier or layer T as shown to the right in FIG. 1B. The plan view of FIGS. 2A and 2B show how the cases making up the tier T are oriented as they travel along the conveyor. The cases enter from the left and the first case of a given tier having a pattern prescheduled by the orienter and shown at the top right in FIG. 2B is moved out of the prevailing line of travel but not turned as shown by the case marked 1. The case 2 is also moved out of the prevailing travel line but not as far as case 1 and is also not turned. Case 4 is allowed to proceed without any rearrangement. Cases 5 and 6 are moved away from their line of travel and are rotated 90°. Cases 7 and 8 are moved a lesser distance and rotated and cases 9 and 10 are moved only slightly and rotated.

The case orientation, case condensation and final formation into a condensed tier is accomplished in the following manner. As the cases enter the palletizer on the left as shown in FIG. 1A the carrying rollers 30 are speeded up. This is done by increasing the size of the sprocket on a driving roller shaft and using a smaller sprocket on the driven shaft as shown in reverse in FIG. 11. This has the effect of spacing the cases a distance apart determined by the amount of the speed differential between the driving and driven roller shafts. Just after spacing each case enters the orienter CO.

CASE ORIENTER

Figure 3A:
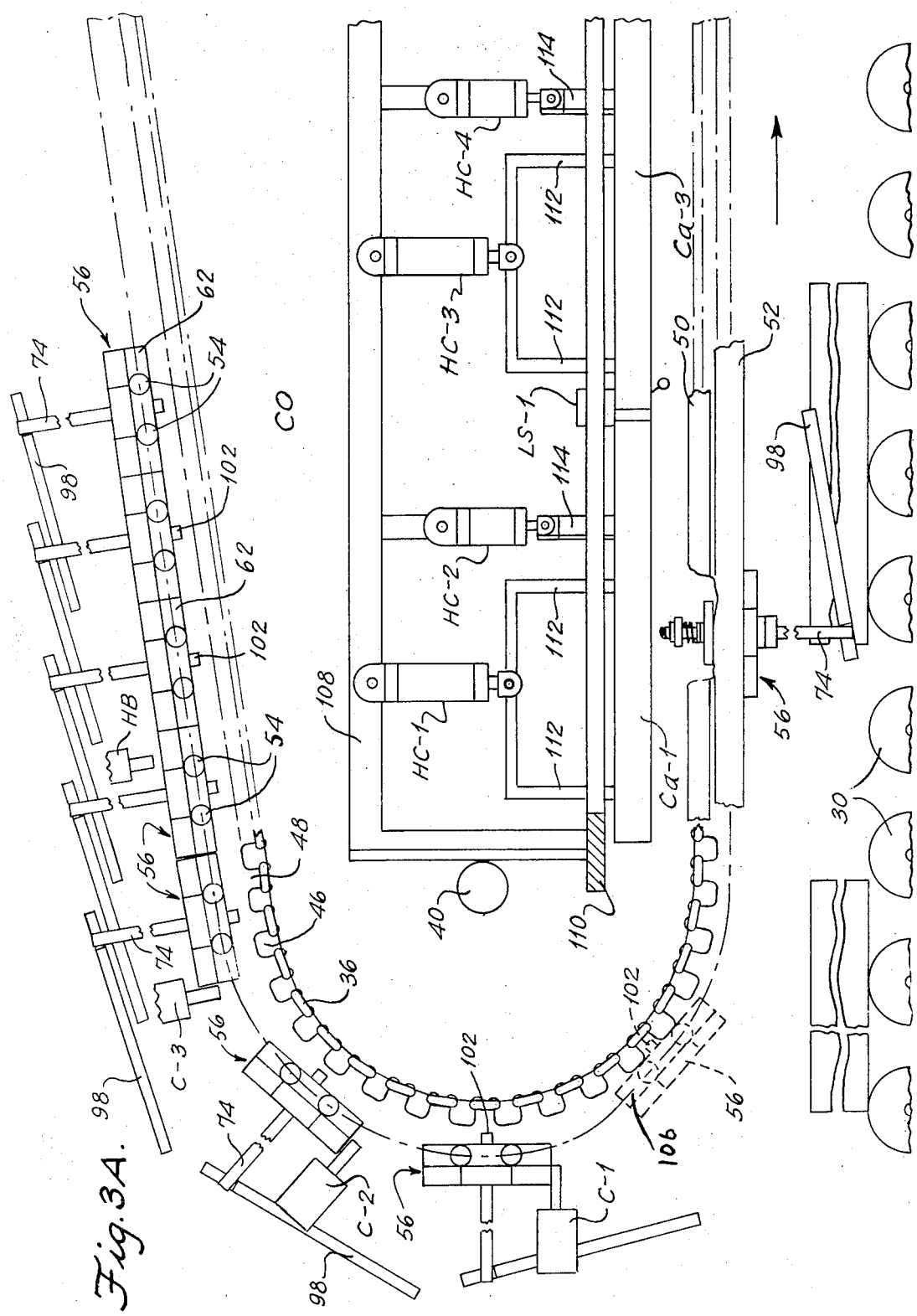

The case orienter CO is shown in enlarged detail in FIGS. 3A and 3B and in smaller scale in FIG. 1A. The case orienter CO comprises a pair of spaced apart chains 36 carried at one end by sprockets 38 fastened to a shaft 40, see FIG. 1A, which is journalled in bearings supported on a frame structure not shown. The opposite ends of the chains 36 are carried by sprockets 42 fastened to a shaft 44 which is also journalled in suitable bearings not shown. The inside links of the chains 36 carry vertically extending attachments 46 which have open spaces 48 between them so that the attachments form teeth. The chains 36 are carried in a closed track 50 as shown in FIGS. 3A and 6. A track 52 parallels the track 50, see FIGS. 1A, 3A and 6, for both of the chains 36. The track 52 serves as a support and guide for the wheels 54 of the cross guides 56 for the orienter arms support carriages 58, see FIGS. 4 and 5. Each cross guide 56 consists of two parallel track bars 60 suitably held in spaced relation at each end by crossties 62 which are what the wheels 54 are suitably fastened to. Each track bar 60 is provided on its inside face with a V-groove 63 which form opposed track surfaces for V-tread wheels 64, see FIGS. 4 and 5. The wheels 64 are mounted for rotation on short pin shafts 68 which extend between carriage frame blocks 66 suitably fastened together at the ends by machine screws 70 passing through spacer blocks 72. The wheels 64 are held slightly loosely between the track grooves 63.

A shaft 74 is journalled for rotation in suitable holes in the frame blocks 66 and has a collar 76 rigidly fastened to it. A roller 78 is mounted for rotation on the shaft 74 and has a hub 80 extending on the bottom side. The wheels 64 and roller 78 may be provided with suitable ball bearings if desired. A suitable thrust bearing 82 is mounted on shaft 74 above the roller 78 and a coil compression spring 84 is placed over the shaft 74 with its lower end bearing on the thrust bearing 82. The upper end of the coil spring 84 bears against the under side of a partial gear 86 having a hub 88 which is set screwed to the shaft 74. A bearing ball 90 is suitably seated on the top of shaft 74 in known manner. Pressure exerted upon the bearing ball 90 as will be later explained moves the entire shaft 74 downwardly against the pressure of the coil spring 84 and separates the collar 76 from the frame block 66 at the bottom. The collar 76 is provided with a detent 92 and the lower frame block 66 is provided with a groove 94 extending radially of the shaft 74 and in which the detent is shown in seated position in FIG. 5 but which leaves the groove when the shaft 74 is pressed downwardly. A second groove 96 is formed in the bottom frame block 66 and extends radially of the shaft 74 at an angle of 90° to the groove 94. Thus when the shaft 74 is pressed downwardly and rotated 90° and then released the detent will leave the groove 94 and seat in the grove 96 which enables the shaft 74 to be held fixedly in two positions 90° apart. A pair of case contacting arms 98 and 100, see FIG. 9, are suitably affixed to the bottom of shaft 74.

It will be understood that a chain 36, track 50 and track 52 assembly is placed on each side of the case advancing conveyor CAC and the cross guides 56 extend across the full width of conveyor CAC with a pair of wheels 54 of each cross guide 56 carried in each track 52.

Each cross tie 62 of each cross guide 56 has a detent 102 extending from it which engages between the vertical attachments 46 on the chain 36 so that the cross guides 56 are propelled along with the conjointly moving chains 36 very evenly because there is a detent 102 in engagement with a chain 36 at each end of each cross guide 56.

The case orienter CO is driven by a suitable drive coupled to one end of either shaft 40 or 44 which through the sprockets 38 or 42 which are rigidly attached to their shafts drive the two chains 36 in complete unison. This drive has not been shown because it within itself forms no part of the present invention.

At the point 104, see FIG. 1A, the track 52 is moved outwardly away from the main track 50 far enough to disengage the detents 102 from between the attachments 46 and this disengaged condition extends to the point 106 where the track 52 is moved inwardly to reengage the detents 102 with the attachments 46. This causes each cross guide 56 as it reaches the point 104 to disengage from the drive chains 36 and coast down the incline caused by the difference between the diameters of sprockets 38 and 42 until they are stopped. This stoppage is caused by successively positioned solenoid operated catches C-1, C-2 and C-3 as shown in FIG. 3A. The orienter CO is originally assembled with a cross guide being restrained by each catch. Then when the catches are simultaneously operated as will be later explained and a solenoid operated hold-back HB is operated at the same time, one cross-guide 56 will be completely released by the catch C-1 and the other two catches will each receive a new cross-guide while HB prevents more than one cross-guide from being released by the catch C-3. When HB is de-energized all of the cross-guides 56 banked up behind the one held by HB will move ahead by gravity.

The cross-guide 56 released by the catch C-1 will move rapidly down to the point 106 where it will again be picked up by the two chains 36 and again moved around to the point 104 as shown in FIG. 3A.

The arms 98 are attached to the shaft 74 at less than a right angle so that they can nest as shown in FIG. 3A when they accumulate ahead of the catches and thus save length on the conveyor CAC.

The number of cross-guides 56 employed will vary with the length of the case orienter CO but there must always be enough used so that there will always be cross-guides restrained by the three catches C-1, C-2 and C-3.

The positions which the orienter arms support carriages 58 assume along the cross-guides 56 are controlled by movable cams Ca-1 through Ca-6 shown in FIGS. 2A, 3A, 5 and 7, which are connected for movement downwardly and upwardly by hydraulic cylinders H-1 through H-6, respectively, as shown in FIGS. 3A, 3B and 7. These hydraulic cylinders are supported by a frame 108 which also supports a plate 110 which has suitable guide openings for the link arms 112 and 114 which connect between the cylinders and cams. This frame 108 is suitably supported from the case orienter frame not shown except fragmentarily in FIG. 6 where two vertical supports 116 and 118 for the tracks 50 and 52 are shown.

When in raised position the cams Ca-1, etc., have no function and the carriages 58 pass freely under them. When in lowered position the cams Ca-1, Ca-3 and Ca-5 contact the rollers 78 and move the carriages out of their free rectilinear paths into a diagonal path which extends as far across the conveyor CAC as there are cams in the down position. When only Ca-1 is down the carriage 58 whose roller 78 which contacts it will be moved to the position shown by case 3 in FIG. 2B. When cam Ca-3 is also down the carriage 58 will be moved to position the case it is orienting as shown by case 2 in FIG. 2B. When cam Ca-5 is also down the case being oriented will be positioned as shown by case 1 in FIG. 2B. In FIG. 2A the alignment of the cams is shown.

The cams Ca-2, Ca-4 and Ca-6 are provided with a tooth rack surface as shown in FIG. 8 which cooperates with the part gears 86 to rotate the shafts 74 when the cams with the tooth faces are down. Each of the tooth face cams are also provided with a horizontal area 120 which acts as a cam surface to contact the ball bearing top 90 on shaft 74 when the tooth face cam is down. The tooth face cams are lowered and raised by their hydraulic cylinders entirely independently of the smooth face cams.

When only Ca-1 and Ca-2 are down the case oriented by the carriage 58 which contacts these cams is oriented into the position shown by case 9 or 10 in FIG. 2A. When cams Ca-1, Ca-3 and Ca-4 are down the cases oriented will be positioned as shown by cases 7 and 8 of FIG. 2A. When cams Ca-1, Ca-3, Ca-5, and Ca-6 are down the oriented cases will be positioned as shown by cases 5 and 6 in FIG. 2A. When one or more of the smooth face cams are down a case being oriented is only displaced to one side of its original rectilinear path. When a tooth face cam is down in addition to one or more of the smooth face cams the case being oriented is also rotated 90° in addition to being displaced. In this manner the cases making up a scheduled tier, for example, as shown at T in FIG. 2B, will be oriented as shown along the conveyor CAC in FIGS. 2A and 2B.

Figure 10:
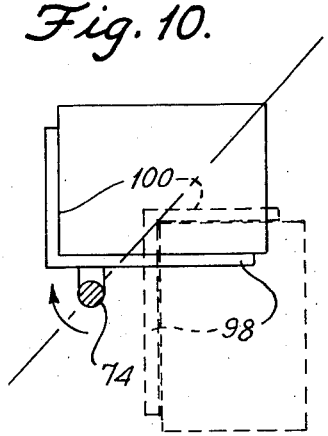
FIG. 10 is a view similar to FIG. 9 but rotates 90° to show how a case is rotated by the arms.

When one of the tooth face cams is lowered by its hydraulic cylinder the horizontal cam surface 120 carried by it is placed in position to be contacted by the ball bearing 90 on top of the shaft 74 of the carriage which next approaches the lowered tooth face cam and upon contact the shaft will be pushed downwardly to unseat the detent from the groove 94. As the part gear 86 contacts the rack teeth on the cam the part gear will be rotated 90° which is the extent of the rack teeth and then stop and the ball 90 will ride from under the surface 120 and let the detent 92 seat in the grove 96 and thus lock the shaft 74 from further rotation. The rotation of the shaft 74 of course also rotated the case being contacted. This rotational function is shown in FIG. 10.

The tooth face cams are so spaced from the smooth face cams as to cause the part gears 86 to take the pushing pressure off of the rollers 78 during the time the part gears and the tooth face cams are in contact and thus avoid any slipping action between the rollers 78 and the smooth face cams.

It will be noted that the V-wheels 64 when the roller 78 is not in contact with a smooth face cam are pressed downwardly by the weight of the carriage 58 which presses the wheels into contact with the bottoms of the grooves in both track bars 60 and thus the wheels do not rotate freely at that time along the v-tracks in the track bars. This prevents the carriages 58 from coasting along the cross-guides due to vibration, etc. When a roller 78 contacts a smooth face cam, however, the V-wheels are pushed backwardly away from the forward groove which permits the V-wheels to run freely in the aft v-groove track.

It will be understood that all of the hydraulic cylinders employed in this invention will be supplied with pressure fluid from a conventional power pack not shown.

The control of the hydraulic cylinders associated with the case orienter CO is accomplished by the following electrical programming and control circuit.

CASE ORIENTER CONTROLS

As previously described, the CAC conveyor rollers are speeded up at a point just as the cases enter the orienter CO. This point is identified by D in FIG. 1A and a space is thus created between each two cases as shown between cases 2 and 3. There are two reasons for having these spaces. The first is so that the cases can be counted electrically at this point and the other is to permit any case to clear any one of the Ca cams before the next case passes on to that cam for a reason to be discussed later.

For the purpose of creating electrical signals for counting the cases and other control functions a light sensitive cell switch PS - 1 and its light source or mirror L - 1 are positioned as shown in FIGS. 1A and 2A so that the passage of a case as shown by case 2 will operate the light switch once. This switch is adjustable along the conveyor CAC in both directions in order to establish the most accurate position for it. This switch is a standard item of commerce.

When the switch PS - 1 is operated by a passing case the first effect of the signal produced is to energize and release the catches C - 1, 2 and 3 and activate the hold-back HB so as to release a set or unit composed of shaft 74 and case contacting orientation arms 98 – 100 to pick up the case. This has happened as shown in FIG. 1A. Case 2 has just actuated PS - 1 and the orienter carriage for the arms of 98 – 100 shown just above case 2 has been released by C - 1 and is moving down to where it will be picked up by chains 36 which are always driven at a speed greater than the speed at which the cases are being moved by the rollers 30 so that the arms 98 - 100 will quickly overtake the case and move it through the orienter CO.

Figure 13:
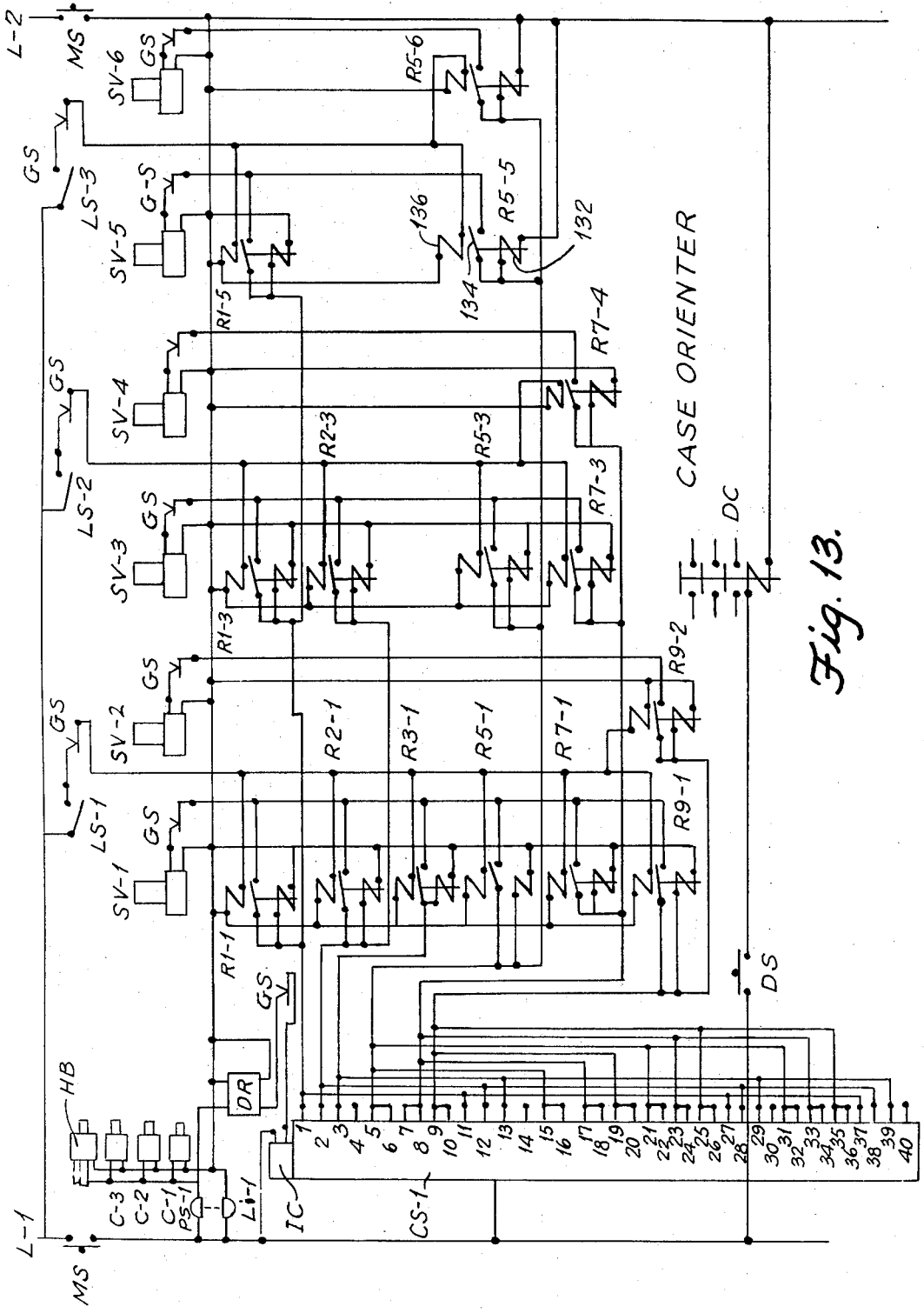
FIG. 13 is a circuit diagram of the case orienter.

The electrical circuit for the switch PS - 1 and the catches C - 1, 2 and 3 and HB are shown in the upper left hand corner of FIG. 13. This circuit can be traced from power line L - 1 to the switch PS - 1 to the catches and HB to power line L - 2. The power line L - 1 and L - 2 can be any desired source of electrical power but for instrument actuation and safety a line power of 24 volts D.C. is preferred. These same power lines will be used to provide the power for all of the circuits used in this invention and shown in the various Figures.

The other function of the signals produced by PS - 1 is to operate the counter switch CS - 1 also shown in FIG. 13. This switch controls the circuitry which stores the data necessary to actuate the Ca cams so as to orient each case properly to form the desired final pattern and to alternate the position of the pattern of the tiers of cases stacked on the pallets. As shown in FIGS. 2A and 2B the orienter CO has completed the formation of a tier T which is resting on the pallets. As shown in FIGS. 2A and 2B the orienter CO has completed the formation of a tier T which is resting on the stripper plate SP which is shown as being capable of supporting two tiers at a time which enables it to deliver completed tiers to two pellets one at a time. The numbering of the cases of the tiers defines the sequence in which the orienter positioned the cases to form the final tier pattern. It will be noted that the tier of cases T resting on SP has the gap G on the right side in the tier T shown at the top in FIG. 2B and the tier shown at the bottom has the gap G shown on the left side as has the tier shown in FIG. 2C. These are all in the same pattern but difference in the positions of the gap is caused by changing the relative positions of the cases within the pattern so that contacting cases in touching tiers will overlap instead of being superimposed. For purpose of distinction the two forms of the same pattern have been designated X and Y in FIGS. 2B and 2B.

The stripper plate SP is moved forwards and backwards horizontally by the hydraulic cylinder HC - 8, see FIGS. 1B and 2B, as will be later explained. In the position shown in FIG. 2B the last movement of SP has moved the tier Y away from the discharge end of the orienter where tier X is now located and which is where tier Y was deposited on SP before SP last moved. As soon as tier Y was out of the way tier X was deposited on SP and the orienter was at that time beginning the formation of another type X tier as shown in FIGS. 2A and 2B. For the purpose of explanation SP is shown in FIG. 2B in a slight delayed position because in practice SP would start to move again just as soon as tier X was deposited on it and would be well along on its second movement which when completed would place tier X in position on the SP over the tier Y shown in FIG. 2C and would have stripped tier Y of FIG. 2B off onto the tier X positioned directly beneath it to form the alternate Y - X - Y - X stack shown in FIG. 1B up to the desired height of the stack on the pallet.

To facilitate stripping of the tier Y off of the stripper plate SP, tier clamp TC - 1 would have been moved very slightly by its hydraulic cylinder HC - 10 to clamp tier Y against fixed adjustable back stop 130 before SP started to move so that the tier Y would be held in proper position to settle down on the tier X beneath it without having the position of any case disturbed.

In order to achieve the alternate X - Y tier stacking when using one stripper plate SP to make two stacks alternately it is necessary that the orienter CO form two X tiers and then two Y tiers alternately regardless of what particular pattern is being formed and this is what is accomplished by the counter switch CS - 1.

Referring to FIG. 13, the counter switch CS is one of the type where its circuit-making contactor is stepped sequentially one contact at a time by its ratchet indexing coil IC each time IC receives a separate signal or impulse from PS - 1 from contact 1 to the end of its capacity, which in this case is 40, and then automatically repeats. This counter switch is a standard item of commerce.

Since the time when the signal which case 2 generated when it broke the beam to PS - 1 to release the orienter carriage directly above it in FIG. 1A and the time when the same signal will be needed to actuate the proper Ca cams must be different in order to give case 1 ahead of case 2 the time required for it to move off of the first cam Ca - 1 before the cams are set up for case 2, a standard type of time delay relay DR which can be adjusted to give the delay desired is inserted in the circuit diagram of FIG. 13 as shown. This circuit can be traced from L - 1 to PS - 1 to DR to L - 2. This will cause the relay DR to be actuated as soon as PS - 1 is actuated but the response to this signal is delayed and not transmitted by DR until the end of the delay period so that coil IC will not get its actuating signal until the end of the delay period when it will be actuated to move or advance the contactor of CS - 1 to the contact which will set up the desired Ca cam or cams to move case 2 to the proper oriented position. This circuit can be traced from L - 1 to coil IC to a gang switch GS to be later described to the output side of relay DR to L - 2.

Each of the 6 Ca cams hydraulic cylinders 1 through 6 has a corresponding solenoid operated control valve numbered SV - 1 through 6 in FIG. 13 which are preferably of the 4-way type in which the position to direct fluid to the cylinder to move its Ca cam upwardly and hold it there is controlled by a spring and the position to direct fluid to the opposite end of the cylinder to move its Ca cam down to contact a roller 78 is controlled by a solenoid.

The SV valve solenoids are controlled by relays which are all alike so that only one will be described and R5 - 5 has been selected. It is a standard holding or latching type relay in which the main coil receives a signal and operates an armature to close one or more circuits and the armature is latched and held in closed position even though the coil signal is discontinued until a release coil receives a signal to release the latch. In R5 - 5 the main coil is shown at 132; the contact armature at 134 and the release coil at 136. The relays are energized by the contacts of CS - 1 and the release coils are energized by limit switches LS - 1, LS - 2 and LS - 3 physically located so as to be actuated by the ball bearings 90 on the top ends of shafts 74 of the orienter carriages, as shown in FIGS. 3A and 3B, just as each carriage reaches the end of a Ca cam. LS - 1 controls the release coils for the relays for Ca - 1 and Ca - 2; LS - 2 controls the release coils for Ca - 3 and Ca - 4, and LS - 3 controls the release coils of Ca - 5 and Ca - 6.

In order to get as much as possible of the two X type two Y type patterns cycle of the counter switch CS - 1 in the drawings, the start of the formation of the X tier on SP will be made to coincide with the start of the sequence function of CS - 1.

When case 1 of tier T - X tripped the beam to PS - 1, CS - 1 contact 1 was closed through delay relay DR and this energized Relays R1 - 1, R1 - 3 and R1 - 5 which respectively energized SV - 1, SV - 3 and SV - 5 to operate hydraulic cylinders HC - 1, HC-3 and HC - 5 which moved Ca cams Ca - 1, Ca - 3 and Ca - 5 down into position to be contacted by roller 78 of whichever orienter carriage picked up case 1 and case 1 was moved sidewise as well as forwardly until the roller 78 passed off of the end of Ca - 5 and shortly thereafter the arms 98 – 100 released case 1 as the cross guide 56 which carried the carriage went up and around sprocket 42 with the chain 36. The case 1 was then travelling in the same straight line as the case 1 shown near T - X on conveyor CAC. As the orienter carriage for case 1 passed by the end of each Ca cam it tripped each limit switch LS - 1, 2 and 3 in turn so that each of the cams moved upwardly out of operative position as the carriage passed it.

Each of the cases of tier T - X in turn operated PS - 1 to advance CS - 1 one contact in the same manner as case 1 which set up certain relays or none, as required, to energize the proper solenoid valve or valves to activate the proper Ca cam or cams. Thus case 2 set up relays R2 - 1 and R2 - 3 and caused Ca cams Ca - 1 and Ca - 3 to be moved down into operative position to place case 2 the same as the case 2 on CAC near T - X. The following cases of this pattern series will be intended when a case position is referred to later.

Case 3 set up relay R3 - 1 and case 4 did not set up any relay because it was in position to pass through the orienter CO without being repositioned. Case 5 however set up relays R5 - 1. R5 -3, R5 - 5 and R5 - 6 because it not only had to be moved sideways the full amount possible but then had to be rotated by the tooth face cam Ca - 6 rotating the part gear 86 of the orienter carriage which carried the arms 98 – 100 which were in contact with case 5. Case 6 was treated the same as case 5 and to this end the contacts 5 and 6 of CS - 1 were tied together. Case 7 set up relays R7 -1, R7 - 3, and R7 - 4 because it had to be moved both sidewise and rotated. Case 8 set up the same relays as case 7 so that contacts 7 and 8 of CS - 1 were also tied together. Case 9 set up relays R9 - 1 and R9 - 2 because it has to be moved sidewise and turned. Case 10 was treated the same as case 9 so that contacts 9 and 10 of CS - 1 were tied together.

Because the second of the two T - X tiers, which is the one in the process of formation on conveyor CAC, must be formed in exactly the same way it is only necessary to tie together contacts 11 and 1; 12 and 2; 13 and 3; 14 is not used, 15 and 5; 16 and 6; 17 and 7; 18 and 8; 19 and 9, and 20 and 10 and the second set of 10 cases will be tiered exactly the same as the first 10.

In the formation of the two Y tiers, the same latching relays will be used but in a different sequence to place the cases in the order shown by the case numbers on the Y tiers in FIGS. 2B and C. Thus case 1 shown to the extreme left in FIG. 2A will actuate contact 21 which is tied to contact 5 and will set up the same relays as did the earlier case 5 on conveyor CAC which will place the presently considered case 1 in the position shown for case 5. The case 2 following the just discussed case 1 will actuate contact 22 which will cause it to be treated the same as case 6 and 2 will have a position corresponding to case 6.

Case 3 will require the same treatment as case 7 so that contact 23 which it will operate is tied to contact 7. Case 4 corresponds to case 8 so that the contacts 23 and 24 are tied together. Case 5 corresponds to case 9 so that contacts 25 and 9 are tied together. Case 6 corresponds to case 10 so that contacts 25 and 26 are tied together. Case 7 corresponds to case 1 so that contacts 27 and 1 are tied together. Case 8 corresponds to case 2 so that contacts 28 and 2 are tied together. Case 9 corresponds to case 3 so the contacts 29 and 3 are tied together. Case 10 corresponds to case 4 and moves through the orienter CO without any change of position, leaving contact 30 which it activates open like contact 4.

The second Y tier will be formed with the same sequence of relays as tier Y-1 was formed so it is only necessary to tie together the contacts which are required to form these two tiers. Thus contacts 31 and 21 are tied together; contacts 31 and 32 are tied together; contacts 33 and 23 are tied together; contacts 34 and 33 are tied together; contacts 35 and 25 are tied together; contacts 36 and 35 are tied together; contacts 37 and 27 are tied together, contacts 38 and 28 are tied together; contacts 39 and 29 are tied together, and contact 40 is open and marks the end of the four tier cycle. The next case through will again activate contact 1 and start a new cycle.

The electrical power for the entire palletizer is controlled by the master switch MS shown in FIG. 13. The drive controls for the drives, not shown, for conveyor CAC, the orienter CO and the case condenser CC are at D.C. and are activated by switch DS.

The orienter carriages 58 which have been moved along the cross guides 58 by the Ca cams and in some instances rotated ninety degrees must be fully returned to their starting positions. For this purpose a long, fixed spiral cam 140 is positioned at a point on the far side of the CO as viewed in FIG. 3B and gradually extends towards the viewer as it turns and moves upwardly to the point shown. This cam will contact the roller 78 of any orienter carriage which was moved to one side during orientation of a case and gradually move it back to where it can take its pick-up position over incoming cases.

Those carriages which have been rotated will have the arms 98 – 100 extending in a different position from the arms of those carriages which were not rotated and two limit switches are carried by a suitable bracket 142 supported from the frame and control a hydraulic cylinder HC - 11 which is also supported from a frame carried bracket 144. The cylinder HC - 11 carries a tooth face cam Ca - 7 just like the other tooth face cams but positioned so that the cam is moved upwardly by the cylinder.

Figure 17:
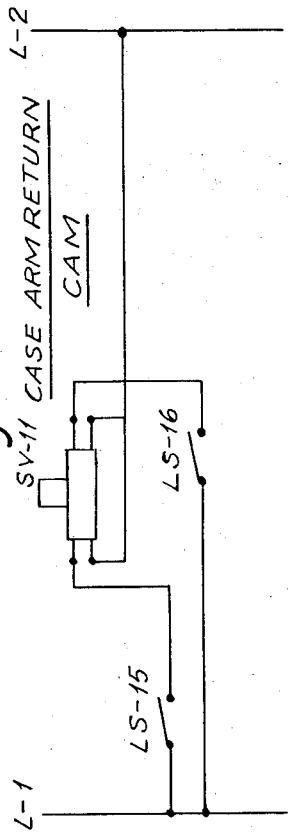
FIG. 17 is a circuit diagram of the operating cylinder for the case contacting arms position return cam.

The two limit switches LS - 15 and 16 control a four-way solenoid valve SV - 11, shown in FIG. 17 which is of the type where one solenoid moves the valve to a position to move the piston of HC - 11 to move cam Ca - 7 up to contact the part gear 86 and rotate the arms 98 – 100 back to original position and the other solenoid moves the valve to a position to move the piston of HC - 11 back again to retract cam Ca - 7 so that it will not attempt to falsely rotate the arms of those carriages which have not been moved by a Ca cam. Limit switch LS - 15 causes the cam Ca - 7 to move upwardly and LS - 16 retracts it.

It will be noted in FIG. 8 that the part gear has 8 teeth whereas the tooth face cam has only 4 teeth. The first 4 teeth of part gear 86 counting in a counterclockwise direction in FIG. 8 rotate the arms initially and the second 4 teeth rotate the arms back to their original position. It will be noted that the cases were speeded up at point D in FIG. 1A to separate them and that case orienter CO runs at a speed which enables the arms 98 – 100 to overtake the cases at the beginning of the orientation operation and so pushes them ahead of the rollers during the side pushing and rotating operations. This causes a slight resistance to the movement of the cases because they are being pushed ahead of the rollers which serves to hold them tightly in the arms instead of the case tending to coast away from the arms.

When the cases are released by the arms 98 – 100 which is approximately at the point E of FIG. 1A the speed of the rollers 30 is substantially reduced and then slightly reduced again at each of points F.G. H and I of FIG. 1B, the purpose of which is to cause the cases to gradually converge and overlap where possible into a condensed form approaching the area of the final tier. This operation is actually only a partial condensing operation to produce as much overlap as possible before all of the cases of the tier under formation have been oriented and before the cases progress very far in between the side condensing adjustable guides 150 diagramatically shown in FIGS. 2A and 2B. Also this way of condensing standing alone is too slow and could not produce the spacing required between the consecutive tiers to facilitate loading of the tiers on pallets. To secure a final, positive and rapid condensing of the cases into the final tier shape and area a case condenser CC is employed.

CASE CONDENSER

The case condenser CC is basically of the same construction as the case orienter CO so the description of this construction will not be repeated. The differences reside in the case contacting means used by the two different components. Instead of the orientation carriages 56 and arms 98 – 100 the CC uses only a simple adjustable width blade 160, see FIGS. 1B and 2A connected to each of the cross-guides of which only 3 or four are required depending on the length of CC and its speed which will usually be the same as CO but can be varied if desired.

Each blade is made up of a central cross section 162 which has arms 164 fastened to it by adjustment bolts 166 which enable the overall length of the blade 160 to be adjusted when a change in the pattern of the tier requires it.

Figure 18:
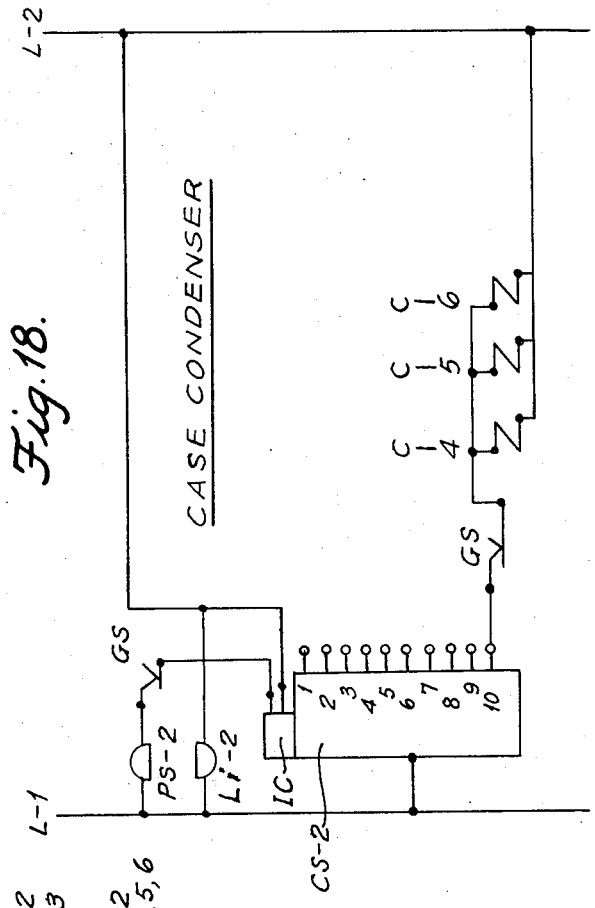
FIG. 18 is a circuit diagram of the counter control for the case pattern condenser.

The cross guides are again held in operation-ready positions by three solenoid operated catches C - 4, C - 5 and C - 6, shown only in FIG. 18 corresponding to the catches C - 1, C - 2 and C - 3 of the CO.

A light sensitive switch is positioned as shown in FIGS. 2A and 1B where the last case of a tier passing it will release the catches C - 4, C - 5 and C - 6 and drop a blade 160 into the chains 36 so that the dropped blade can move up behind the last case of a tier formation and move it ahead and move on to pick up all of the cases of the tier and thus condense the cases together in the line of movement while the side guides 150 move the cases together into final tier form from the two sides.

The circuit diagram of the controls which enables the CC to always be operated only by the last case of a tier formation is shown in FIG. 18 wherein the light sensitive switch PS - 2 and its light source Li-2 operate a second counter switch CS - 2 exactly the same as counter switch CS - 1 except it has only 10 contacts one of which is operated by the PS - 2 each time a case passes the beam but none of the contacts 1 through 9 are connected to any thing. The contact 10 is connected to energize the catch solenoids C - 4, 5 and 6 as shown in FIG. 18. This enables each 10th case which marks the end of a tier formation to drop a blade 160 to come up behind the 10th case and then the 9 preceding cases and thus condense them as above explained.

As soon as the cases are condensed or shortly thereafter the case condenser CC releases the tier and the blade 160 moves up and ahead to the starting point catches and the condensed tier is immediately picked up by the tier transfer TT and moved onto the stripper plate SP which is what has just happened in FIG. 1B but it should be noted that in FIG. 1B the new tier X is positioned directly behind the previously formed tier Y.

TIER TRANSFER

The Tier Transfer TT comprises a pair of horizontal tracks 170 suitably supported from the frame not shown and extending along each side of conveyor CAC as shown in FIG. 1B and each supporting a monorail trolley 172 with the two trolleys interconnected by a spanner beam 174. It will be understood that the nearest trolley 172 is omitted from FIG. 1B in order to show the parts intermediate of the two trolleys.

Each trolley 172 includes a pair of wheels 178 carried by a frame 176. A shaft 180 extends between the two trolleys and has a movable blade 182 connected to it by arms 184. The shaft 180 also has an arm 186 rigidly connected to it about 30 degrees below the horizontal as shown. This arm 186 is connected to the rod end of a hydraulic cylinder HC - 7 by a linkage 188 pivotally connected to both the arm 186 and the rod end. The opposite ends of arms 184 from the ends which are connected to the blade 182 are stopped in each of their two 90 degree apart positions by a stop block 190 carried by each trolley frame. This linkage arrangement is such that when the cylinder rod is pulling inwardly the blade 182 is rotated downwardly as shown in the right hand position of FIG. 1B and will in that position come up behind the tier and transfer it to the stripper plate SP as shown in FIG. 1B. When the cylinder then starts to move outwardly the arms 184 will first rotate outwardly until the blade is horizontal as shown in the middle position of the trolley in FIG. 1B in which position it can pass over any cases which might have moved into the area as the trolleys are then moved to the left in FIG. 1B. This position of course changes again to the vertical as soon as the rod end again starts to move inwardly just before the trolleys start to move to the right.

The control circuit diagram for the tier transfer TT is shown in FIG. 14 in which the relays R1 and R2 are the same type as shown in FIG. 13 and the solenoid control valve SV - 7 is a fourway type in which the valve after operation by one solenoid stays in the moved position until the opposite solenoid is energized.

The normal position of rest, if any, for the trolleys 172 is as shown in dotted lines in the middle in FIG. 1B. When a blade 160 of CC releases a tier and moves upwardly to the position shown in dotted lines to the extreme right of CC in FIG. 1B it closes limit switch LS - 6 suitably supported in the position shown. This completes a circuit from L - 2 to the main coil of Relay R1 to L - 1 which closes the contacts to energize the rod end outside of SV - 7. This causes the rod end to move the trolleys 172 to the left until the blade 182 assumes the left dotted dotted line position when LS - 7 is closed. This sets up a circuit which energizes the release coil of relay R1 which allows its contactor to open which de-energizes the rod outside of the solenoid valve SV - 7 and also energizes the main coil of relay R2 which energizes the rod inside of the solenoid valve SV - 7 which causes the rod end to move in which first rotates blade 182 down to the vertical position and then moves the trolleys 172 to the right so that the blade 182 moves the waiting tier onto the stripper plate SP and up against the back stop 130 at which time the trolleys close LS - 4 which energizes the release coil of R2 to de-energize the rod in solenoid of SV - 7 and also energizes the main coil of relay R1 which energizes the rod out side of SV - 7 and the trolleys 172 move to the left until a projection 192 carried by a trolley closes and then rides by LS - 5 and stops unless LS - 6 is at once again closed by a blade 160 to start another cycle.

The tier transfer TT is actually shown in a slightly delayed position as explained before in connection with the stripper plate SP in order to have the equipment in a better position for explanation.

STRIPPER PLATE

The stripper plate SP is one usable type of transporting means and comprises a plate 200 long enough to at any one time extend across the conveyor CAC and also across one of the two stacker stations shown. Plate 200 is supported and stiffened on the left side by a girder 202 which is supported for rolling contact by a series of rollers 204 which extend all of the way across the end of conveyor CAC and both stacker stations and are supported by suitable frame members 206 and 208. The opposite side of plate 200 is supported by a vertical riser and stiffener 210 which has a lip at the top which rides on a second series of rollers 212 carried by frame member 214.

The plate 200 is reciprocated from one extreme position to the other by a hydraulic cylinder HC - 8 which is suitably attached to frame 214 at the base end and the rod end is attached to the plate 200 at point 216. Like the other hydraulic cylinders the conventional fluid lines have been omitted to save space on the Figures.

The control circuit diagram for HC - 8 is shown in FIG. 15 in which the solenoid valve SV - 8 which is a fourway type in which the valve remains in the positioned moved by one coil until the other coil is energized, and the limit switch LS - 8, is a normally open - normally closed type in which the actuating lever operates a ratchet mechanism which on one actuation of the lever opens one set of contacts and closes the other set and on the next actuation of the lever reverses the two positions and continues this alternation. This limit switch is a standard item of commerce.

Figure 2C:
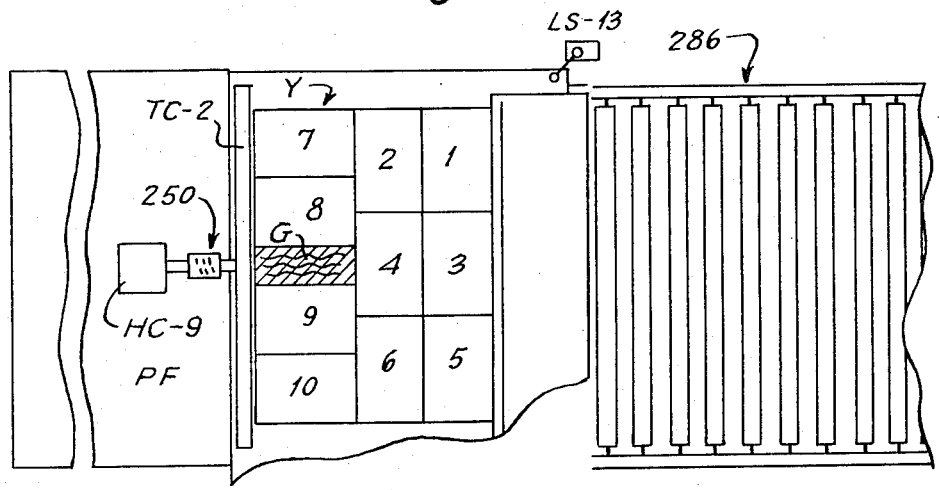

A normally closed limit switch LS - 9 is positioned as shown to be opened when the rod end is fully extended which places the plate 200 adjacent to the conveyor CAC and the pallet loading station shown in FIG. 2C, and a normally closed limit switch LS - 10 is placed as shown to be opened when the rod end is all of the way closed which places the plate 200 adjacent to the conveyor CAC and the pallet loading station shown in FIG. 2B as shown in this FIG.

With the plate 200 in the position shown in FIG. 2B the relative limit switch positions are as shown in FIG. 15 in which LS - 9 is not actuated and is closed; LS - 10 is actuated and is open; the lower set of contacts of LS - 8, which is mounted to be actuated conjointly with LS - 4 as shown in FIG. 1B, have just been opened and the upper set have just been closed when the trolley 172 contacted both LS - 8 and LS - 4. LS - 10 is being held open by contact with the rod end. The closing of the upper set of contacts energized the piston out end of the cylinder HC - 8 so the plate 200 is in the act of moving on to the pallet loading station shown in FIG. 2C and at the end of its stroke LS - 9 will be opened and de-energize the out side of SV - 8. The out movement of the rod end closed LS - 10.

The plate 200 will remain in that position and the switches will all hold the positions just described until the trolley 172 again contacts LS - 8 which will close the lower and open the upper contacts of LS - 8 and a circuit will be made from L - 1 to closed lower contacts of LS - 8 through closed LS - 10 to the in side of SV - 8 and HC - 8 will move plate 200 back to the position it is shown in FIG. 2B.

TIER CLAMPS

The tier clamps briefly described above are operated by hydraulic cylinders HC - 9 and HC - 10 which are controlled by the circuits shown in FIG. 16 in which the solenoid valves SV - 9 and SV - 10 are of the fourway type in which the valve is moved in one extreme position by a solenoid and in the opposite extreme position by a spring; and the relays R1 and R2 are the same as has been used throughout this invention.

Each of the rods for the cylinders HC - 9 and HC - 10 are provided with a spring coupling 250 which restricts the pressure which either clamp can exert upon a tier.

The tier clamp operated by cylinder HC - 10 is shown in operated position and was so placed when a lug 252 carried by one end of plate 200 closed LS - 11 when it moved into the position shown in FIG. 2B and will remain in operated position until plate 200 again moves a set distance. The closure of LS - 11 energized the main coil of relay R1 which closed its contacts and energized the coil of SV - 10 as well as locked the contacts in closed position. This caused the HC - 10 to actuate the clamp.

When plate 200 again moves, the clamp will prevent any of the cases in the tier from being displaced and when the lug 252 on plate 200 contacts LS - 12 the holding coil of relay R1 will release the relay contacts and thus de-energize the coil of SV - 10 which will withdraw the piston of HC - 10 and unclamp jaw TC - 1 which will permit the cases of the tier to settle accurately in place on the pallet stack below.

The clamp TC - 2, FIG. 2C, is controlled by lug 254 on the opposite end of plate 200 and limit switches LS - 13 and LS - 14 to operate the HC - 9 cylinder clamp TC - 2 in the exact same manner with the same type of circuit also shown in FIG. 16.

The two pallet feeders marked PF in FIGS. 2B and 2C and the pallet stacker elevators, within themselves, form no part of the present invention and have not been disclosed in detail. Any of the well known types described can be used, for example, the type disclosed in U.S. Pat. No. 2,633,251 can be used advantageously and a fragmentary section of the elevator is shown at 280 and the loaded pallet feed out conveyor at 284 in FIG. 1B. The feed out conveyors feed onto loaded pallet receiving conveyors 286 as shown in the foregoing patent.

GANGSWITCH PATTERN CHANGER

Figure 19:
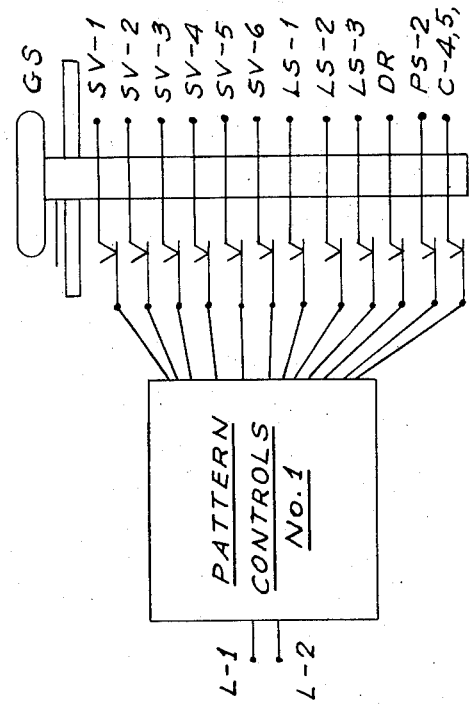
FIG. 19 is a circuit diagram for the gang switch pattern selector.
Figure 20:
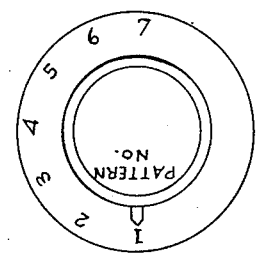
FIG. 20 is a plan view of the gang switch pattern selector knob.

Instead of laboriously using numerous switches between counter switches, relays, limit switches, etc. when it is desired to change patterns to handle different numbers of cases and different arrangements of cases as has been done frequently heretofore, with the circuitry of the present invention it is possible to arrange the counter switches and relays, etc. required for any given pattern and properly wired in modular form with the circuit connections made to a gangswitch as shown in FIG. 19 with the common pattern formation components used with all paterns wired to movable blade contactors of the gangswitch which is a standard item of commerce. Thus the counterswitch CS - 1 and all of the relays shown in FIG. 13 and counter switch CS - 2 shown in FIG. 18 can all be included in the Pattern Controls No. 1 module and connected to the gangswitch as shown in FIGS. 13, 18 and 19. Other pattern control modules would be assembled with each including the relays and counter switches to properly operate the Ca cams to orient the cases into the desired pattern whatever it might be. This number depending on how many patterns are required for a given palletizer application, one module for each different pattern required, and the modules would be connected to the gangswitch the same as module No. 1. Then all that would be required to change a pattern would be to move the gangswitch dial shown in FIG. 20 to the desired pattern number.

The palletizer of the present invention makes it possible to have a large selection of patterns for a given unit because of the unusual flexiblility of the operation of the Ca cams. The lengths of these cams will usually be selected to accomodate the largest case to be handled and then the smallest case can usually be handled by the same cams. However if the range in case sizes is exceptionally large, the lengths of the cams can be cut in half and twice as many cams and operating cylinders used because no more space will be required. Then the cams can be used one at a time for the small cases and two at a time or more for the large cases.

Also it is possible to use a second row of cams if desired, for example laid out along the line 300 shown in FIG. 2A. This would require very little additional room and would double the range of the palletizer. Actually, additional rows of cams can be added as needed.

The "floating" orienter arms also provide an unprecedented flexibility in that each case completely determines its own destiny and is, therefore, independent of any prescribed time cycle. If a case is delayed for any reason no harm is done because further action is automatically deferred until it does reach the point where it calls down its own individual orienting facility in the form of the arms 98 – 100 which then send it on its proper way. All of this is accomplished without ever stopping a case until it is in a completed tier. Up to the point of deposit of a completed tier on the stripper plate SP the cases undergo a gentle no-stop, one way flow.

If such is preferred the Ca cams instead of being moved straight up and down can be rotated into and out of position with exactly the same mechanism used to rotate the tier transfer blade 182 except the cams would not, of course, be reciprocated so that a much shorter hydraulic cylinder would be used for the actuator.

The double action stripper plate SP greatly increases the capacity of the palletizer because it eliminates any waiting time for the return of the plate as is true when a single stacker is used. Also, dividing the output between two stacked pallets in separate areas gives better access to the stacked pallets for fork trucks, etc.

Various electrical safety interlocks can be provided as desired. For example between the orienter CO and the case condenser CC; between the case condenser CC and the tier transfer TT and between the tier transfer TT and the stripper plate SP and between the stripper plate SP and the operating components of the tier elevator and pallet feeders. The interlocks would be of known type which stop all components when any one component fails.

All objects capable of being palletized whether termed containers, cartons, cases etc. are to be considered synonymous within the capacity of the palletizer of the present invention.

In order to vary the position of any case within the tier-forming area provided by the conveyor CAC under the orienter CO to meet any particular tier pattern requirements the position of the connection between the shaft 74 and the arms 98 – 100 can be varied as desired, for example, to the point shown at 74A in FIG. 9. When using such a position for the shaft 74 - arm connection, it would probably be advisable to reposition the cam Ca - 2 to position Ca - 2A as shown in FIG. 2A and rotate the cases while running or passing straight through the tier forming area in order to hold them closer to the lower side of conveyor CAC as shown in FIG. 2A. This would eliminate the need for using cam Ca - 1 prior to using cam Ca - 2A. This also serves to show the flexibility which can be obtained by these cams.

The shaft 74 and the two arms 98 – 100 form an arm unit. The arms 98 – 100 may be lengthened as required so that each unit can orient two cases where any given pattern indicates that such would be desirable.

Where the weights of the cases being oriented are low the part gears 86 and the tooth face cams can be replaced by simple friction contacting elements.

Throughout this specification the use of orientation to denote the movement of a case or cases into a selected position implies the use of any desired path of movement for the case which can include recti-linear, curvilinear and rotative motion.

It is to be understood that the case orienter of the present invention can be used to arrange cases in any desired formation or arrangement or pattern in addition to the palletizer tiers disclosed.

It will be noted that regardless of how high a speed of movement the cases reach prior to or during the case arrangement operation they always come to a gentle stop or near stop just before transfer to the stripper plate SP which fully protects the cases and their contents from any dammage or spillage. The transfer TT can move at a relatively slow speed and the hydraulic cylinder HC - 7 can be provided with a cushioned end at the rod in position so that the contact of the formed tiers with the stop 130 can be very gentle.

It is pointed out that each of the relay circuits controlled by the counter switch CS - 1 shown in FIG. 13 constitutes a memory bank and that all of the relay circuits and their controls comprise an electrical memory system. The data stored in each memory bank is just which Ca cams will be activated when any given memory bank is energized by the counter switch CS - 1.

The foregoing is to be considered as descriptive and not limitative because many changes and modifications can be made in the physical structure and steps shown without departing from the scope of the invention.

The invention having been described, what is claimed is:

1. A case palletizer comprising means for forming cases into tiers, an elongated stripper plate having sufficient area to hold two completely formed tiers, mounting means for said stripper plate rendering it slidable in two opposite directions to two opposite positions, said means for forming cases into tiers forming said tiers in a receiving position and directly on the portion of the stripper plate located in said receiving position means for sliding said stripper plate so that when it is in one opposite position it can receive a completed tier formed by the tier forming means while holding a previously formed tier over a first pallet on one side of said tier receiving position, and when sliding to its other opposite position deposits the previously formed tier upon the pallet beneath it and moves said recently received tier over a second pallet on the other side of said tier receiving position and places the empty portion in the tier receiving position to receive a newly formed tier, means for sliding said stripper plate in said opposite directions and means for effecting the deposit on said tiers on said pallets.

* * * * *

UNITED STATES PATENT OFFICE
CERTIFICATE OF CORRECTION

Patent No. 3,809,254    Dated May 7, 1974

Inventor(s)  John M. Loach

It is certified that error appears in the above-identified patent and that said Letters Patent are hereby corrected as shown below:

Claim 1, line 8, insert a comma after "position"; line 20, "on" should read -- of --.

Signed and sealed this 24th day of September 1974.

(SEAL)
Attest:

McCOY M. GIBSON JR.
Attesting Officer

C. MARSHALL DANN
Commissioner of Patents